Figure 5:
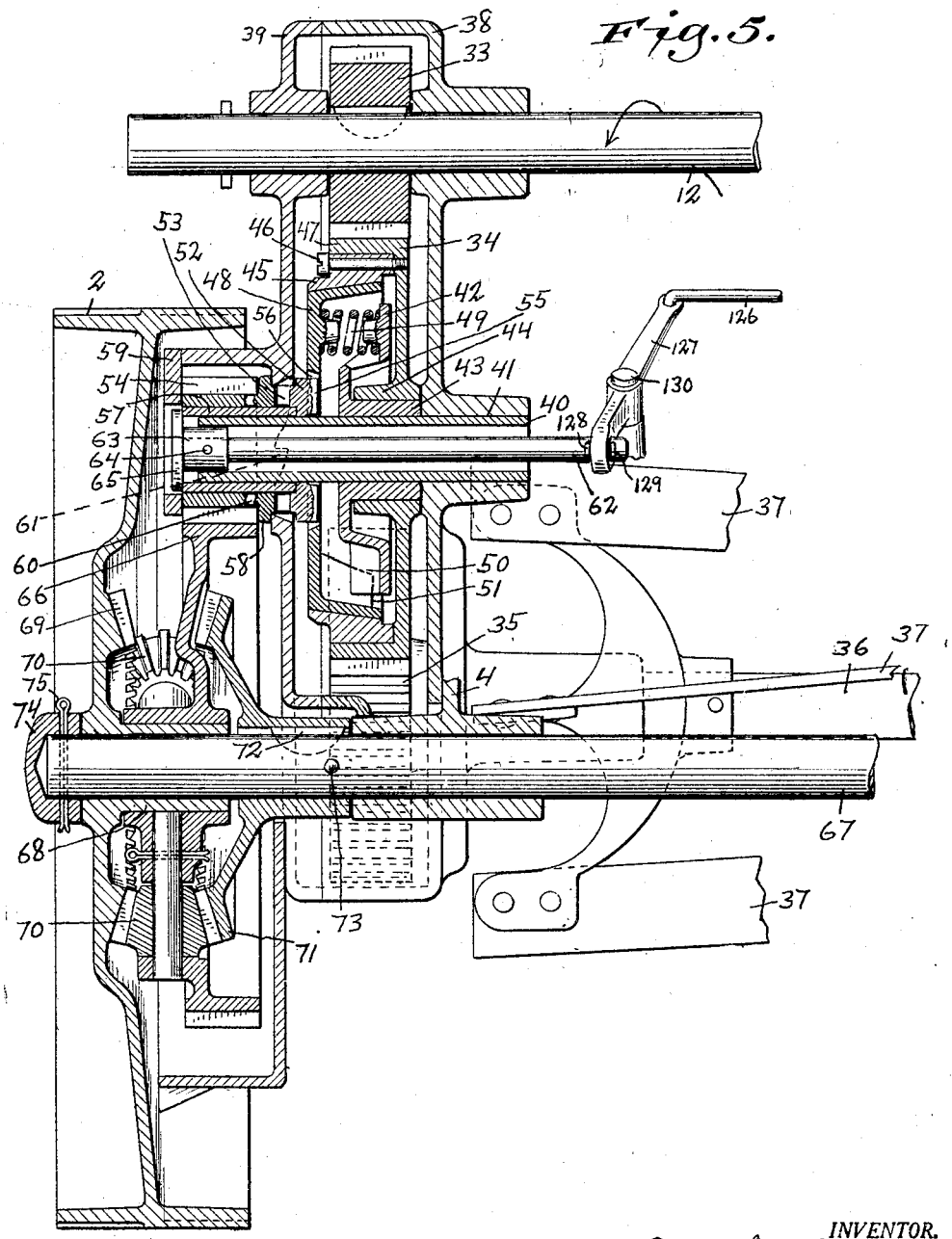

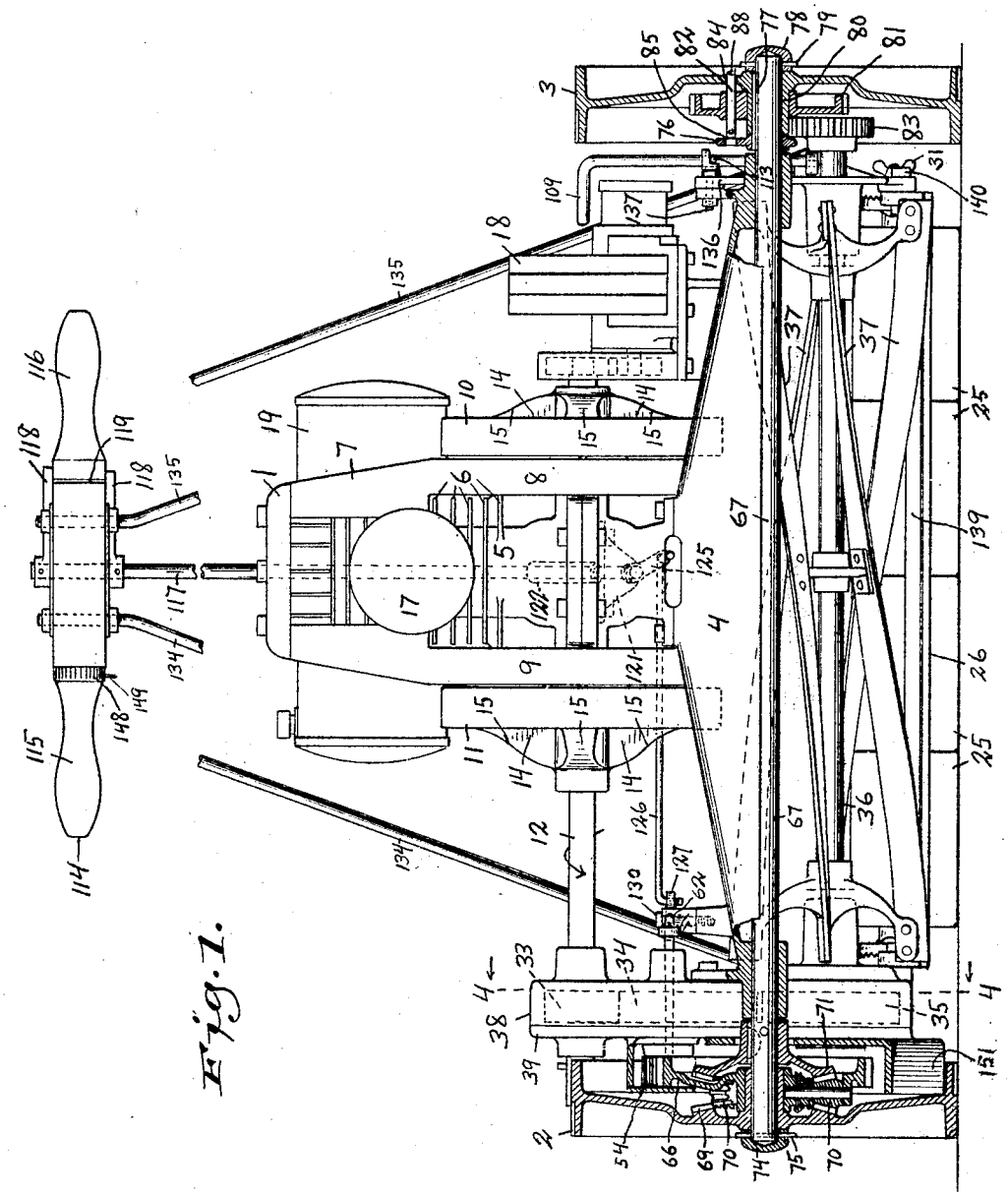

Feb. 26, 1929.
A. J. DREMEL
1,703,521
LAWN MOWER
Filed April 5, 1922     5 Sheets-Sheet 2
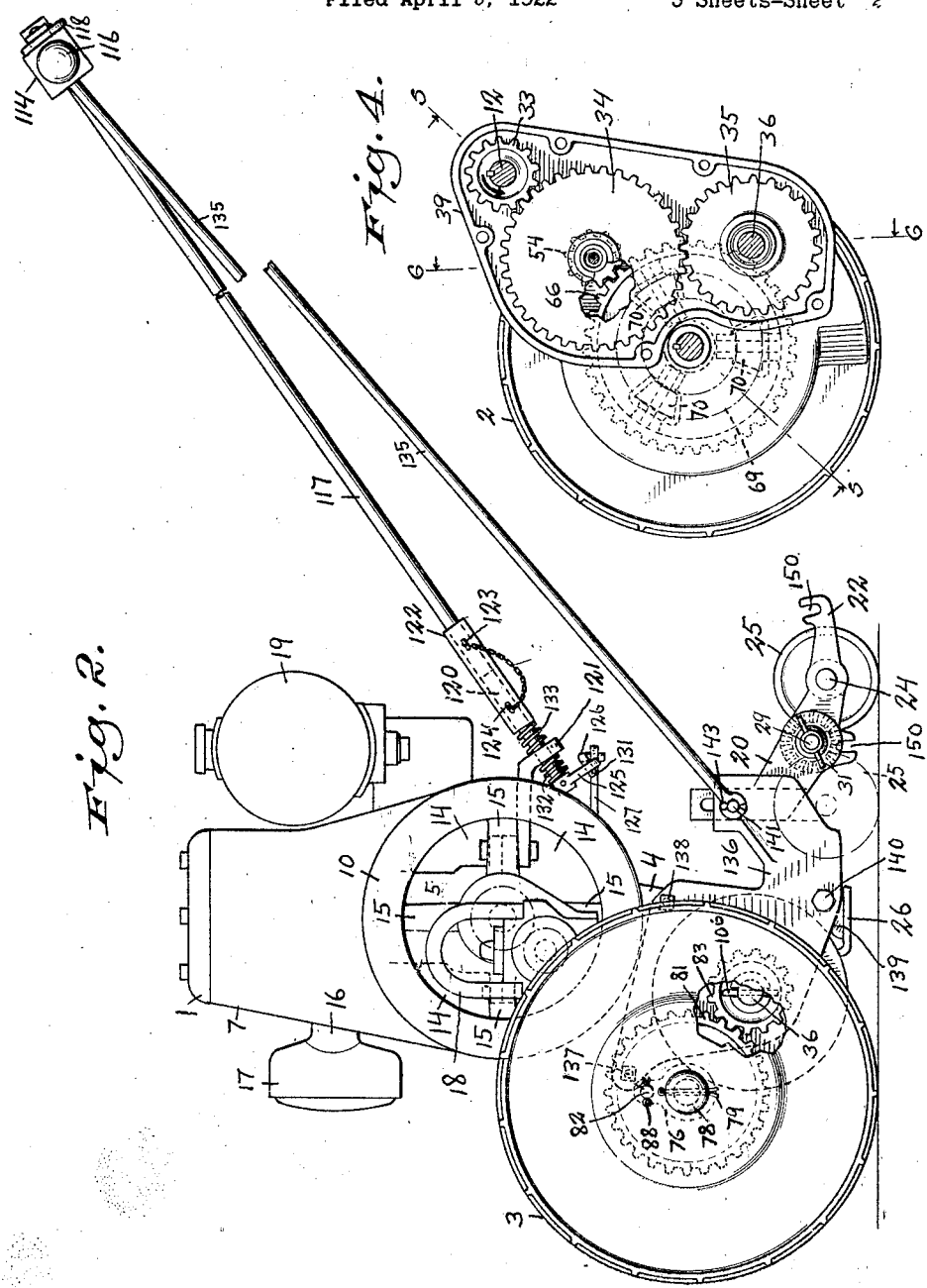
INVENTOR.
Albert J. Dremel
BY
Bottum, Hudnell, Lecher & McNamara
ATTORNEYS.

Feb. 26, 1929.
A. J. DREMEL
1,703,521
LAWN MOWER
Filed April 5, 1922    5 Sheets-Sheet 3
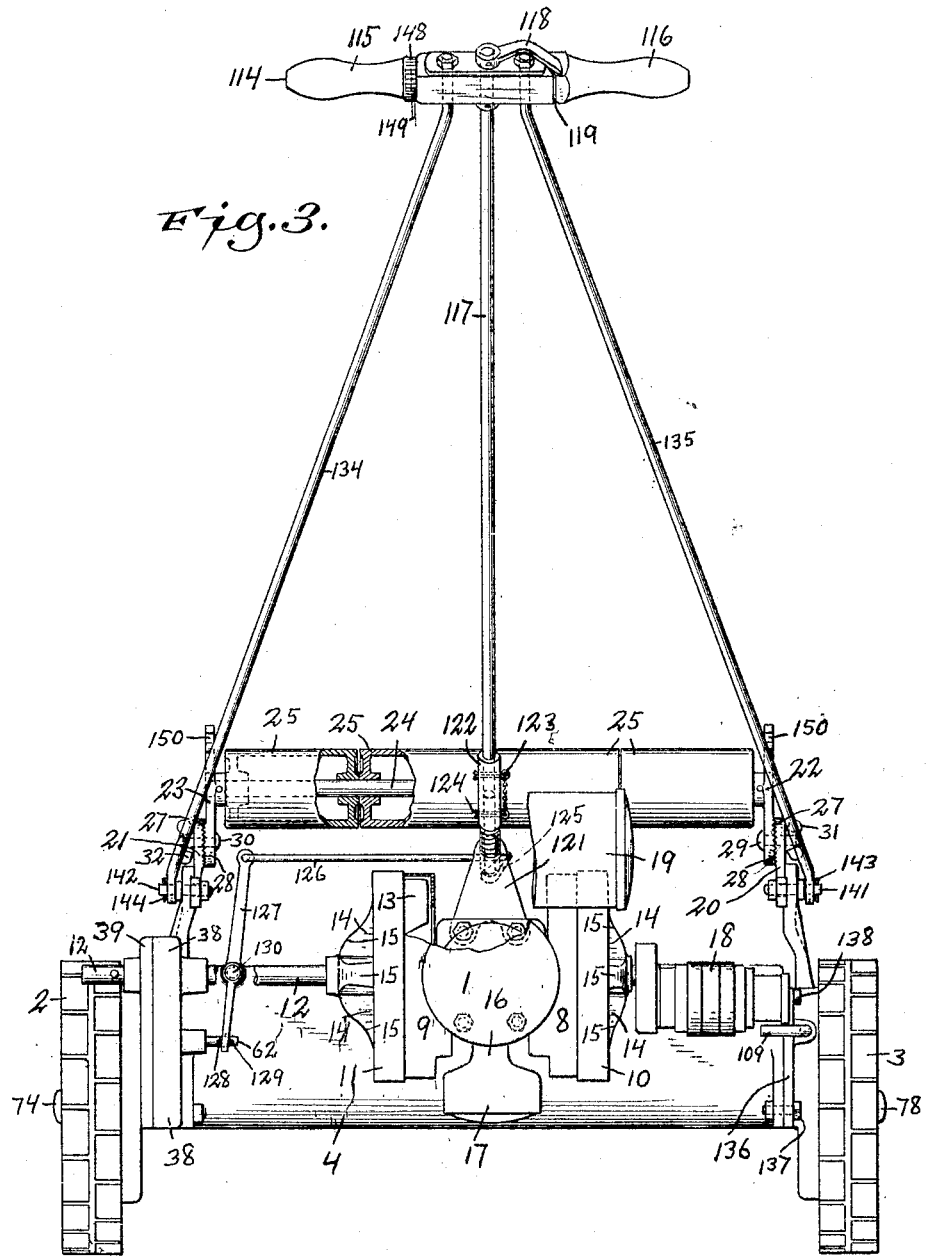

Feb. 26, 1929.

A. J. DREMEL 1,703,521

LAWN MOWER

Filed April 5, 1922  5 Sheets-Sheet 4

INVENTOR.
Albert J. Dremel
BY
ATTORNEYS.

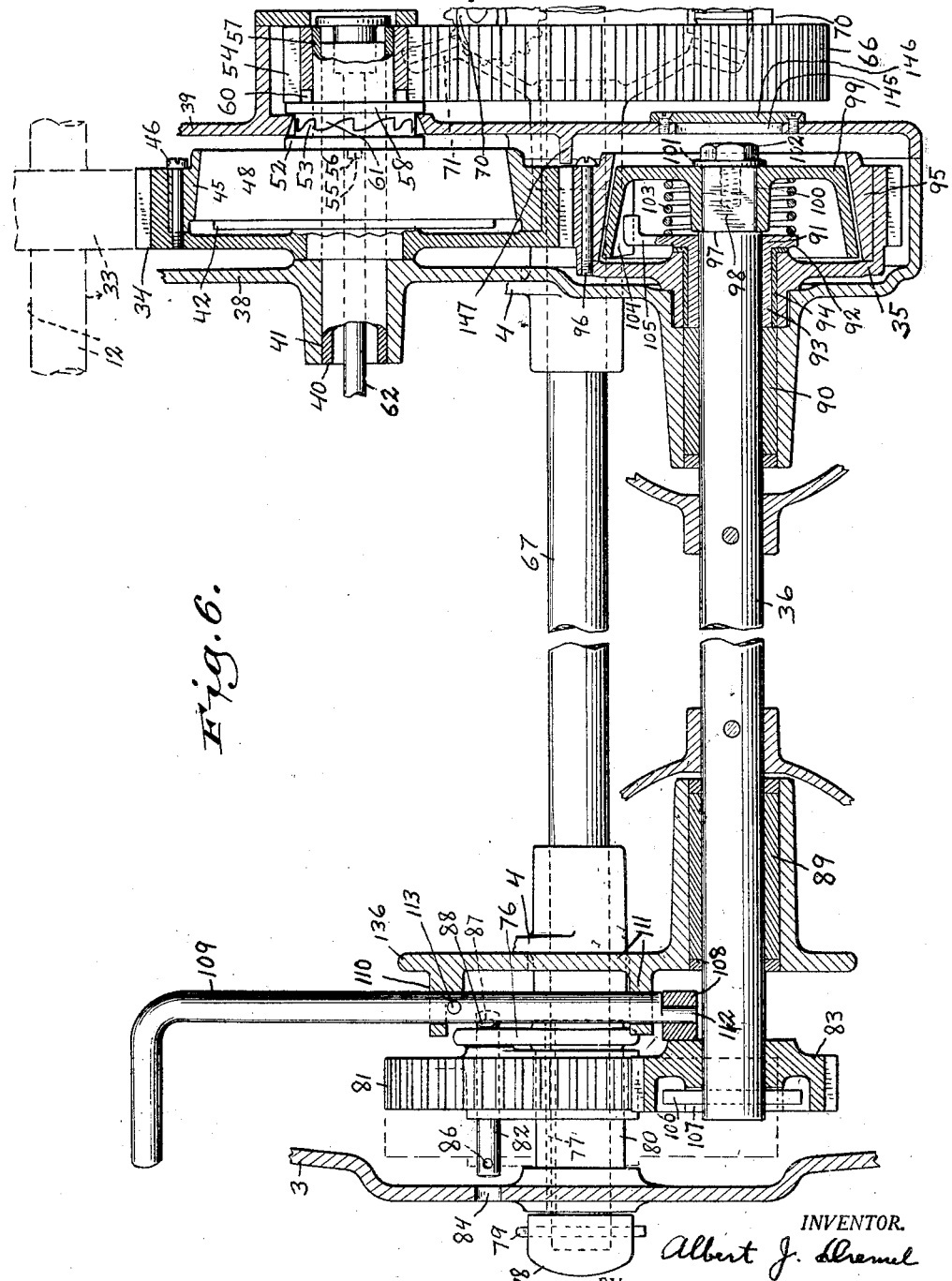

Patented Feb. 26, 1929.

1,703,521

UNITED STATES PATENT OFFICE.

ALBERT J. DREMEL, OF RACINE, WISCONSIN.

LAWN MOWER.

Application filed April 5, 1922. Serial No. 549,783.

This invention relates to lawn mowers and the object of the invention is to improve the construction and operation of lawn mowers in the manner to be hereinafter described and claimed.

Referring to the drawings which accompany this specification and form a part hereof, which drawings illustrate an embodiment of this invention, and on which drawings the same reference characters are employed to designate the same parts wherever they may appear in each of the several views, Fig. 1 is an elevation of the lawn mower, viewed from the front, parts being broken away and parts being shown in section; Fig. 2 is a side elevation of the lawn mower, parts being broken away; Fig. 3 is a plan view of the lawn mower, parts being broken away; Fig. 4 is a vertical section on the line 4—4 on Fig. 1, looking in the direction indicated by the arrows, a part of the frame being omitted, and parts being broken away; Fig. 5 is a section through parts of the lawn mower, the section being taken on the line 5—5 on Fig. 4, looking in the direction indicated by the arrows, the figure being drawn on an enlarged scale; and Fig. 6 is a section, on an enlarged scale, through parts of the lawn mower, the plane of the section being indicated by the line 6—6 on Fig. 4, the section being viewed looking in the direction indicated by the arrows.

Referring to the drawings, the reference numeral 1 designates a motor which is illustrated by the drawings as an internal combustion motor or engine, which is ultimately supported by ground-wheels 2 and 3 and which is a single direction motor as distinguished from a reversible motor or engine. In the construction illustrated by the drawings, the motor 1 is immediately supported by a base 4 which is also the upper cross-member of a frame to which the ground-wheels 2 and 3 are connected in the manner to be hereinafter described. The cylinder 5 of the motor is illustrated as provided with heat-radiating fins 6 and the cylinder is partially surrounded by an air-jacket 7 and fan-casings 8 and 9. The flywheels 10 and 11, on the crank-shaft 12, are provided with fan-vanes 13 so that the flywheels, when being rotated, force air through the spaces 14 between their arms 15 and through the fan-casings 8 and 9 and the air-jacket 7, over the cylinder 5 and the heat-radiating fins 6 to cool the cylinder, in a manner which will be readily understood. The motor 1, as illustrated, is provided with an exhaust 16, a muffler 17, a magneto 18, a fuel or gasoline tank 19, all shown by the drawings and which may be of any suitable or preferred construction, and fuel connection, carburetor, spark-plug, and lubricating mechanism and accessories which, being well-known, are not illustrated by the drawings for the sake of simplicity of illustration. The specific motor illustrated by the drawings is of the two-cycle type but this invention is not confined to any specific type or characteristic of motor. The motor 1 is located, as a matter of preference, in the rear of the axis of rotation of the ground-wheels 2 and 3, and the frame is provided with rear-extensions 20 and 21 to which are adjustably secured roller-arms 22 and 23. A shaft 24 is secured to the roller-arms 22 and 23 and has a plurality of rollers 25 separately mounted thereon. A single roller of any considerable length would tend to scrape the grass and ground, by reason of what is known at "slip" when the lawn mower is being turned, and a single short roller is not desirable for the reason that the roller, besides affording a stable equilibrium and assisting in supporting the lawn mower, is actually relied upon for its rolling effect in compacting, evening and solidifying the ground where it has been slightly displaced by earth-worms, for example. The fixed-knife or cutter-bar 26 is secured to a lower cross-member of the frame and, by adjusting the roller-arms 22 and 23, which involves the simultaneous movement of the shaft 24 and the rollers 25, with respect to the rear-extensions 20 and 21, the height of the fixed-knife or cutter-bar 26 can be varied and the height of the grass to be left standing can be accurately predetermined. The rear-extensions 20 and 21, and the roller-arms 22 and 23 are provided with coacting radial serrations 27 and 28 which radiate from holes for bolts 29 and 30. By loosening the nuts 31 and 32, the serrations can be sprung apart or disengaged and the roller-arms 22 and 23, carrying the shaft 24 and the rollers 25, can then be turned into other positions of adjustment; the serrations can then be engaged and the nuts 31 and 32 tightened. The wheel-base, so to speak, of the lawn mower can also be altered by the same mechanism, as the roller-arms 22 and 23 can be rotated about the bolts 29 and 30 through a complete arc of 180 degrees so that the rollers 25 can be positioned at different distances from the ground-wheels 2 and 3, as clearly shown by the full-line and the dotted-line positions of the rollers 25 by Fig. 2 of the drawings. For cutting grass on ground that is fairly level, or of fairly even surface without regard to level, the longer wheel-base as shown by the full-line position of the rollers 25, on Fig. 2 of the drawings, is preferred on account of the greater stability or equilibrium of the lawn mower and the more evenly cut surface, or nap, of the grass; while on rougher ground, the shorter wheel-base, as shown by the dotted-line position of the rollers, is preferred to avoid the possibility of the reel-knives and the cutter-bar 26 contacting with, or digging into, the ground.

The crank-shaft 12 has a pinion 33 keyed, or otherwise suitably secured thereto, and this pinion 33 meshes with a gear 34. The gear 34 meshes with the gear 35 which drives the reel-shaft 36 through a friction-clutch mechanism to be hereinafter described. It will be readily seen that, with the construction thus far described, the rotation of the crank-shaft 12 by the motor 1 will rotate the reel-shaft 36 and the reel-knives or cuters 37 secured thereto. The gear 34 also rotates or drives the ground-wheels 2 and 3 by means of the following mechanism. Referring, now, especially to Fig. 5 of the drawings, the reference numeral 38 designates an end member of the frame to which a gear-cover 39 is secured, and the crank-shaft 12 is journaled in the end member 38 of the frame and projects through the gear-cover 39. The end member 38 of the frame is bored to receive a tubular bushing 40 which may be pressed into the bore 41 or secured therein in any suitable manner to hold it rigid and stationary to serve as a fixed stud or shaft. A spider 42 provided with a tubular hub 43 is rotatably mounted on the tubular bushing 40 and the gear 34 is rotatably mounted on the tubular hub 43 of the spider 42. The hub 44 of the gear 34 is slightly shorter than the tubular hub 43 of the spider 42 on which it is mounted, so as to provide for absolute freedom of rotational movement. An inwardly-increasing-tapered friction-ring 45 is secured by screws 46, for example, within the rim 47 of the gear 34. A friction-cup 48 is assembled within the friction-ring 45, and the friction-surfaces of the friction-cup 48 and the friction-ring 45 are held in contact when springs 49 force the friction-cup 48 outwardly from the spider 42. It will be readily understood that this construction is a friction-clutch mechanism and, from an inspection of the drawings, it will be observed that the tubular hub 43 of the spider 42 has a bearing against the end member 38 of the frame. The spider 42 and the friction-cup 48 are locked together against relative rotational movement without preventing relative longitudinal movement in any suitable manner as, for example, by a fin 50 on the spider 42 engaging within a recess 51 provided in the friction-cup 48. A clutch-member 52, provided with clutch-teeth 53, is connected with the friction-cup 48 to clutch the friction-cup 48 to the pinion 54. The construction illustrated by the drawings is as follows. The clutch-member 52 is mounted for rotation on the tubular bushing 40 and has projections 55 which engage in slots 56 in the friction-cup 48. Another tubular bushing 57 fits over the outer end of the tubular bushing 40 and bears against the clutch-member 52. The pinion 54 and a facing-clutch-member 58 are rotatably mounted on the tubular bushing 57 and are held together by being located between a part of the gear-cover 39 and a gear-housing 59 secured to the gear-cover 39. The facing-clutch-member 58 is provided with projections 60 to engage in recesses in the pinion 54 and is also provided with clutch-teeth 61 to engage with the clutch-teeth 53 on the clutch-member 52. The clutch-teeth 53 and the clutch-teeth 61 could be formed directly on the friction-cup 48 and the pinion 54, respectively, having regard only to function and operation, and the mechanical reason for the use of the separate clutch-member 52 and the facing-clutch-member 58, in the construction illustrated and described, is so that the clutch-teeth may be formed of steel, or other suitable hard metal, while the friction-cup 48 and the pinion 54 can be formed of cast-iron to minimize expense. A clutch-rod 62 extends into the tubular bushing 40 and has a flanged head 63 secured thereto by a pin 64. The flange 65 is of greater diameter than the bore of the tubular bushing 57 and, when the clutch-rod 62 is pulled inwardly, the tubular bushing 57 will be forced inwardly and will force the clutch-member 52 and the friction-cup 48 inwardly, compressing the springs 49, disengaging the clutch-teeth 53 from the clutch-teeth 61, and disengaging the friction-surface of the friction-cup 48 from the friction-surface of the friction-ring 45.

The pinion 54 meshes with the master-gear 66 of a differential driving mechanism or differential-gear mechanism. The ground-wheel 2 is loose on the shaft 67 and has a tubular hub 68 and is provided with a bevel-gear 69 for engaging with bevel-pinions 70 which are mounted on the master-gear 66. The master-gear 66 is journaled upon the tubular hub of the ground-wheel 2 and is free to rotate thereon. A bevel-gear 71 also meshes with the bevel-pinions 70 and is secured to the shaft 67 by the key 72 and the pin 73, for example, to prevent any relative movement of the bevel-gear 71 with respect to the shaft 67. A cap 74 and a pin 75 keep the ground-wheel 2 in position on the shaft 67 with the bevel-pinions 70 in proper mesh with the bevel-gears 69 and 71. The ground-wheel 3 and a collar 76 are keyed, by a key 77, to the other end of the shaft 67 and are retained on the shaft by a cap 78 and a pin 79. The ground-wheel 3 has a tubular hub 80 on which a gear 81 is slidably mounted. The gear 81 has a short rod 82 secured thereto which projects on opposite sides thereof so that the gear 81 can be moved to such a position that the short rod 82 will only engage with the ground-wheel 3 by passing through a hole 84 therein, or can be moved to such a position that the short rod 82 will only engage with the collar 76 by passing through a hole 85 therein. The short rod 82 is a clutch mechanism for clutching the gear 81 to the collar 76 and the shaft 67, when the gear 81 is moved into mesh with the gear 83, and for holding the gear 81 positively out of mesh, or possibility of meshing, with gear 83. The gear 81 is moved, upon the hub of the ground-wheel 3, away from the ground-wheel 3 to engage it with, or mesh it with, the gear 83, and is moved towards the ground-wheel 3 to disengage it from, or out of mesh with, the gear 83, as will be readily understood from an inspection of Fig. 6 of the drawings. The gear 83 is secured to the reel-shaft 36, to rotate the same, in a manner to be hereinafter described. The short rod, or clutch member, 82 is provided with holes 86 and 87 near its ends through which a cotter-pin 88 can be inserted either outside of the ground-wheel 3 or inside the collar 76 to hold the gear 81 in its two predetermined positions.

It will be readily understood that the differential-gear mechanism permits the ground-wheels 2 and 3 to be rotated at different speeds, when turning the lawn mower, so that the sod will not be damaged.

The reel-shaft 36 is rotatably mounted in bearings 89 and 90 and is also free to be moved longitudinally in said bearings. The bearings 89 and 90 are illustrated by the drawings as bushings located in bores in bosses which extend inwardly from the end members, or frame-standards, of the frame. A bushing 91, provided with a flange 92 and a tubular hub 93, is mounted on a cylindrical part of the reel-shaft 36 and is surrounded by a cylindrical, tubular, anti-friction bushing 94, and the gear 35 is rotatably mounted on the anti-friction bushing 94. The gear 35 has a friction-ring 95 secured thereto by screws 96, for example, and the interior of the friction-ring, which is conical, is of larger diameter at its inner end than at its outer end. An end of the reel-shaft 36 is made of polygonal contour, square for example, forming a shoulder 97, the squared part of the shaft being designated by the reference numeral 98. A friction-cup 99, with a squared aperture 100, is assembled upon the squared part 98 of the reel-shaft 36 and is retained thereon by a bolt 101 which screws into a screwthreaded hole in the end of the reel-shaft 36 and which is provided with a polygonal-shaped head 102 to receive a wrench. A spring 103 bears against the friction-cup 99 at one end and against the bushing 91 at its other end and tends to move the reel-shaft 36, and parts connected thereto, to the right, looking at Fig. 6 of the drawings, but to the left when looking at Figs. 1, 3 and 5 of the drawings, to keep the friction-cup 99 engaged with the friction-ring 95, except when disengaged therefrom in the manner to be hereinafter described. The friction-cup 99 is provided with a recess 104 into which extends an arm 105 on the bushing 91, so that the friction-cup 99 and the bushing 91 will be compelled to rotate together while permitting the friction-cup 99 to be moved longitudinally with respect to the bushing 91. This construction locks the gear 35, the friction-cup 99, and the bushing 91 to the reel-shaft 36, to rotate therewith and reduce friction when the friction-cup 99 is engaged with the friction-ring 95 and to permit the gear 35 to be rotated with very little friction on the bushing 94 when the friction-cup 99 is disengaged from the friction-ring 95.

To provide for the easy removal and replacement of the gear 83, it is bored to fit over the reel-shaft 36 and the reel-shaft is provided with a hole for a pin 106 which engages in a slot 107 in the hub of the gear 83, the gear itself being recessed so as to overlie the pin 106, as clearly shown by Fig. 6 of the drawings. The gear 83 can be slipped over the end of the reel-shaft 36, the pin 106 inserted in its hole, and then the gear slipped back so that the pin 106 will engage within the slot 107 with the gear overlying the ends of the pin. After the gear 83 has been assembled on the reel-shaft 36, an antifriction roller 108 can be placed behind it and the crank-rod 109 placed in its bearings 110 and 111, on an end member or frame standard of the frame, with the eccentric crank 112 engaged in a central hole in the antifriction roller 108. The crank-rod 109 is provided with a stop-pin 113 which projects from one side thereof to contact with shoulders on the bearing 110 to limit the rotation of the crank-rod to an arc of 180 degrees. As the stop-pin 113 is located below the upper part of the bearing 110, it serves to hold the antifriction roller 108 and the crank-rod 109 assembled together and properly assembled with the lawn mower, as the antifriction roller 108 is above and can rest upon the reel-shaft 36. When the crank-rod 109 is turned to the position shown by Fig. 6 of the drawings, the antifriction roller 108 will press against the gear 83 and force the gear 83 and the reel-shaft 36 to the left, compressing spring 103, and disengaging the friction-cup 99 from its frictional engagement with the friction-ring 95, so that rotation of the gear 35 will not rotate the reel-shaft 36. Referring now, to Figs. 1 and 6 of the drawings, the cotter-pin 88 can be removed from the hole 86 in the short rod 82 and the gear 81 moved into mesh with the gear 83. The cotter-pin 88 may then be placed in the hole 87 in the other end of the short rod 82, behind the collar 76, and the driving gear connections will be such that the reel-shaft 36 will be rotated by the motor in the reverse direction and a sharpening stone or tool can be placed in position to be contacted by the reel-knives to sharpen them.

The hand-grip 114 is composed of two parts 115 and 116. The rocking-shaft 117 is journaled in the part 115 and the part 116 is secured to the crank 118 which is rigidly secured to the rocking-shaft 117, so that the part of the hand-grip designated as the part 116 is, in effect, a continuation of the crank 118. The hand-grip 114 may be made of wood and the part 116 separated from the part 115 by a bevel saw-cut 119, for example, so that there will be a positive stop for the part 116 when moved into line with the part 115. The rocking-shaft 117 is provided with an extension 120 journaled in a bracket 121 and the rocking-shaft and its extension are connected by a sleeve 122 which may be connected with the rocking-shaft and its extension by cotter-pins 123 and 124 passed through suitable holes. A crank 125 is secured to the extension 120 and is connected by a rod 126 with a lever 127 which engages with the clutch-rod 62. The lever 127 is illustrated by the drawings as provided with a hole through which the clutch-rod 62 extends and pins 128 and 129 are positioned in the clutch-rod 62 on opposite sides of the lever 127. The lever 127 is pivoted on a stud 130 on the base 4. The end 131 of the rod 126 is bent parallel with the extension 120 of the rocking-shaft 117 and passes through a hole in the crank 125 so that longitudinal movements of the rocking-shaft 117 will not affect the position of the clutch-rod 62. A spring 132 is interposed between the crank 125 and the bracket 121 and a spring 133 is interposed between the bracket 121 and the sleeve 122. These springs are of the open or compression type and constitute resilient means for preventing jars from the machine being transmitted to the hand-grip 114, and permit small movements of the hand-grip 114 to avoid tiring the operator. The handle-rods 134 and 135 are rigidly secured to the part 115 of the hand-grip 114 and are pivotally connected, in line with each other, with the frame standards, so as to turn about a common axis when turned up in a manner to be described. The rocking-shaft 117 is connected with the bracket 121 in a different plane, vertically, from the horizontal plane which passes through the pivotal connections of the handle-rods 134 and 135 and forms a tie-rod to keep the hand-grip 114 in a predetermined position.

The frame of the lawn mower has been referred to hereinbefore generally and its main member is the so-called base 4 which is the upper cross member of the frame to which the motor is secured and in which the shaft 67 is journaled. An end member or frame standard 38 is secured to one end of the base 4 and an end member or frame standard 136 is secured to the opposite end of the base 4 by bolts 137 and 138. A cross-bar 139, to which the fixed-knife 26 is secured, and which is adjustable by screws, not shown, is secured to the end members or frame standards by bolts one of which, 140, is clearly shown by Figs. 1 and 2 of the drawings. The rear extensions 20 and 21 are provided with slotted uprights which are adjustable up or down in grooves in the end members or frame standards 136 and 38, respectively, and are retained in adjusted positions by shouldered bolts 141 and 142 over which are slipped the ends of the handle-rods 135 and 134, respectively, pins 143 and 144 retaining the handle-rods on the bolts.

The reference numeral 145 designates an aperture in the gear cover 39 large enough for the removal of the bolt 101 and this aperture may be covered by a plate 146 secured to the gear cover 39 by screws, as clearly shown by Fig. 6 of the drawings. The gear cover 39 is also provided with a projection 147, see Fig. 6 of the drawings, to prevent the gear 35 from being displaced when the reel-shaft 36 has been withdrawn.

A rotatable ring 148 is mounted on the part 115 of the hand-grip 114 and has a wire 149 connected to it for controlling the throttle, not shown, of the engine. By rotating the ring 148 in one direction or the other, the throttle of the engine can be opened or closed, as the wire 149 is secured to the under side of the rotatable ring 148 to constitute a crank connection.

The notches or open slots 150 in the roller-arms 22 and 23 are to receive a grass-catcher, not shown, and are otherwise of no importance.

The reference numeral 151 designates a scraper which is illustrated by the drawings as an integral part of the gear cover 39 and is intended to prevent any considerable quantity of mud and grass being carried around on the inside of the ground-wheel 2 which might collect on that part of the gear cover 39 extending over the pinion 54.

The construction of the lawn mower and its principles of construction and operation will be readily understood from the foregoing description, when read in connection with the drawings and when considered in connection with the following description.

When the motor 1 is in operation, or running, it will rotate the crank-shaft 12 in the direction indicated by the arrows on the drawings and, with the parts in the positions shown by Figs. 1, 2, 3, 4 and 5 of the drawings, the pinion 33 will rotate the gear 34 and the gear 34 will rotate the ground-wheels 2 and 3, in a direction to propel the lawn mower forward, through the friction-clutch mechanism (including the friction-ring 45 and the friction-cup 48), the positive clutch mechanism (including the clutch-member 52 and the facing-clutch-member 58), the pinion 54, the differential-mechanism (including the master-gear 66, the bevel-pinions 70, and the bevel-gears 69 and 71), the shaft 67 and the key 77 which keys the ground-wheel 3 to the shaft 67. The gear 34 will also rotate the reel-shaft 36, and the reel-knives 37 carried thereby, in the same direction as the ground-wheels 2 and 3, but faster in proportion to the gear ratios, through the gear 35, and the friction-clutch mechanism (including the friction-ring 95 and the friction-cup 99).

When the lawn mower is turned, the differential mechanism will permit a differential rotation of the ground-wheels 2 and 3 to avoid injury to the sod.

If an obstruction, a stick for example, is caught between a reel-knife 37 and the fixed-knife 26, the rotation of the reel-shaft 36 and the reel-knives 37 will be stopped without causing damage or breakage, because the friction-ring 95 can slip on the friction-cup 99, the spring 103 being weak enough to permit such slip under the condition stated.

The friction-clutch mechanism (including the friction-ring 45 and the friction-cup 48) which transmits the power from the gear 34 to the ground-wheels 2 and 3, is primarily intended for use when the lawn mover runs into long grass, for example, and it is desired to reduce the speed of progression of the lawn mower while permitting the reel-shaft 36 and the reel-knives 37 to be rotated at full speed. By holding back on the hand-grip 114, the speed of progression of the lawn mower can be decreased because the friction-ring 45 can then slip on the friction-cup 48, the springs 49 being weak enough to permit such slip under such circumstances.

When the friction-cup 48 is released from frictional engagement with the friction-ring 45 by moving the part 116 of the hand-grip 114, the gear 34 cannot rotate the ground-wheels 2 and 3 but the reel-shaft 36 and the reel-knives 37 can still be rotated by the motor. The lawn mower can then be propelled forward or backward by hand. The purpose of the positive clutch (including the clutch-member 52 and the facing-clutch-member 58) is to leave the pinion 54 entirely free to be moved, or rotated by the master-gear 66 when the friction-cup 48 has been freed from contact with the friction-ring 45, as it will be readily seen that if the pinion 54 were not freed from the friction-cup 48, and the lawn mower were to be moved, the ground-wheels 2 and 3 would have to drive the pinion 54 with the friction load produced by the springs 49 pressing the hub 43 of the spider 42 against the end member or frame standard 38. With the construction illustrated and described, the pinion 54 can be rotated easily by the ground-wheels when the springs 49 are compressed to disengage both the friction-clutch mechanism and the positive clutch mechanism.

The crank-rod 109 can be turned to the position shown by Fig. 6 of the drawings to disengage the friction-cup 99 from the friction-ring 95 to prevent rotation of the reel-shaft 36 and the reel-knives 37 by the gear 35, but the primary advantage derived from this construction is that the gear 81 can be moved into mesh with the gear 83 so that the motor will rotate the reel-shaft 36 and the reel-knives 37 in the reverse direction so that the reel-knives 37 can be contacted with a sharpening stone or implement for sharpening them.

By removing the cotter-pins 123 and 124, the sleeve 122 can be slipped up on the rocking-shaft 117 so as to clear the extension 120 and the handle-rods 134 and 135, with the hand-grip 114 and the rocking-shaft 117, can be swung upwardly to diminish the space required for the lawn mower when not in use.

The reel-shaft 36, with the reel-knives 37 thereon, is readily removed in the following manner without excessive disassembling of the lawn mower. The ground-wheel 2 is first removed by first removing the pin 75 and the cap 74. The plate 146 being thus exposed, it is removed, exposing the bolt 101 which is then removed. The ground-wheel 3 is then removed, with the gear 81 and the collar 76. The bolts 137, 138 and 140, see Fig. 2 of the drawings, are then removed which free the frame standard 136 from the other parts of the frame. The cotter-pin 143 is removed from the bolt 141 and the handle-rod 135 slipped off from said bolt. The removal of the frame standard 136 permits the reel-shaft 36, with the reel-knives 37 thereon, to be removed with it, or the crank-rod 109, the pin 106 and the gear 83 can be removed prior to the removal of the frame standard 136, then the frame standard 136 can be removed, and lastly the reel-shaft 36. The projection 147 prevents displacement of the gear 35, the friction-cup 99 and the bushing 91, so that these parts retain their proper positions for the re-assembling of the same reel-shaft or a duplicate one.

What is claimed is:

1. In a lawn mower, the combination of a frame, a motor supported by said frame and having a crank shaft journaled therein, wheels rotatably supported by said frame at each side thereof, a blade member rotatably supported by said frame intermediate said wheels, a driving connection between said shaft and said blade member, a differential transmission mechanism carried by one and cooperating with both of said wheels for effecting rotation of the latter, and a clutch providing a driving connection between said shaft and said differential mechanism.

2. In a lawn mower, the combination of a frame, a motor supported by said frame and having a crank shaft journaled therein, wheels rotatably supported by said frame at each side thereof, a blade member rotatably supported by said frame intermediate said wheels, a plurality of gears supported in mesh, a differential transmission mechanism carried by one and cooperating with both of said wheels for effecting rotation of the latter, means providing a driving connection between said gears and said shaft and a clutch providing a driving connection between said differential mechanism and one of said gears.

3. In a lawn mower, the combination of a frame, a motor supported by said frame and having a crank shaft journaled therein, wheels rotatably supported by said frame at each side thereof, a blade member rotatably supported by said frame intermediate said wheels, a plurality of gears supported in mesh, means providing a driving connection between said gears and shaft, a differential transmission mechanism carried by one and cooperating with both of said wheels for effecting rotation of the latter, a clutch providing a driving connection between said differential mechanism and one of said gears, a second clutch providing a driving connection between said blade member and another of said gears, and means for independently controlling said clutches.

4. In a lawn mower, the combination with a frame provided with wheels, blades rotatably supported by said frame, and a motor secured to said frame for operating said blades and said wheels, of a clutch connected to said motor, differential gearing connecting said wheels, and a second clutch providing a driving connection between said first-mentioned clutch and said differential gearing.

5. In a lawn mower, the combination of a frame, a motor supported by said frame and having a crank shaft journaled therein, wheels rotatably supported by said frame at each side thereof, a blade member rotatably supported by said frame intermediate said wheels, a plurality of gears arranged in mesh and supported between said shaft and said blade member, clutch means releasably connecting one of said gears to one of said wheels, second clutch means releasably connecting another of said gears to said blade member, and means providing a driving connection between said shaft and said gears.

6. In a lawn mower, the combination of a frame, a motor supported by said frame and having a crank shaft journaled therein, wheels rotatably supported by said frame at each side thereof, a blade member rotatably supported by said frame intermediate said wheels, a plurality of gears arranged in mesh and supported between said shaft and said blade member, clutch means releasably connecting one of said gears to one of said wheels, second clutch means releasably connecting another of said gears to said blade member, means providing a driving connection between said shaft and said gears, and means for independently controlling said clutch means.

7. In a lawn mower, the combination with a frame provided with wheels at each side thereof, a blade member supported by said frame intermediate said wheels, a motor secured to said frame, and a driving connection between said motor and said blade member, of differential transmission mechanism carried by one and cooperating with both of said wheels for effecting rotation thereof, and means connecting said differential mechanism to said motor for operation thereby.

8. In a lawn mower, the combination with a frame provided with wheels at each side thereof, a blade member supported by said frame intermediate said wheels, and a motor secured to said frame, of a plurality of gears arranged in mesh and supported between said motor and said blade member, means providing an operative connection between said gears and said motor, a clutch cooperating with one of said gears and said wheels for operatively connecting the latter to said motor, and a second clutch cooperating with another of said gears and said blade member for operatively connecting the latter to said motor.

9. In a lawn mower, the combination with a frame provided with wheels at each side thereof, a blade member supported by said frame intermediate said wheels, a motor secured to said frame, of a plurality of gears arranged in mesh and supported between said motor and said blade member, means providing an operative connection between said gears and said motor, a plurality of clutches cooperating with said gears for independently connecting said wheels and said blade member to said motor for operation thereby, and means for independently controlling said clutches.

10. In a lawn mower, in combination, a frame having end members, a motor supported by said frame and provided with a crank shaft journaled in one of said end members, a wheel rotatably supported by each of said end members, a blade member rotatably supported intermediate said wheels, and means carried by one of said end members for connecting said blade member and said wheels to said shaft, said means comprising a plurality of gears supported in mesh, means providing a driving connection between said gears and said shaft, differential transmission mechanism, a clutch releasably connecting one of said gears to said differential mechanism, and a second clutch releasably connecting said blade member to another of said gears.

11. In a lawn mower, the combination with a frame, a motor supported by said frame, a blade member rotatably mounted in said frame, and means connecting said blade member to said motor for rotation in a predetermined direction, of a gear supported for rotation and for movement along its axis of rotation, said gear coacting with said means upon such movement and causing rotation of said member in the opposite direction.

12. In a lawn mower, the combination with a frame having a supporting traction element, a motor supported by said frame, a blade member supported by said frame, a driving connection between said member and said motor, a clutch for operatively connecting said element to said motor, and means for controlling said clutch, of a handle comprising a plurality of parts connected for pivotal movement with respect to each other about an axis extending longitudinally of said mower, and a connection between said means and one of said parts whereby said clutch may be applied and released by changing the angular relation between said parts.

13. In a machine of the character described, the combination with the frame and operating mechanism therefor, and the means for controlling said mechanism, of means connected to said frame for guiding said machine and including a hand-grip comprising two oppositely-directed parts and means pivotally connecting the latter for permitting movement of the same into alignment with each other and movement of the same out of alignment with each other, and means connecting one of said parts to said controlling means whereby the latter is moved to its respective driving and non-driving positions upon such relative movements of said parts.

14. In a machine of the character described, the combination with the frame and operating mechanism therefor, and the means for controlling said mechanism, of means connected to said frame for guiding said machine and including a hand-grip comprising two oppositely-directed parts and means pivotally connecting the latter for permitting movement of the same into alignment with each other and movement of the same out of alignment with each other, and means connecting one of said parts to said controlling means whereby the latter is moved to its respective driving and non-driving positions upon such relative movements of said parts, the adjacent ends of said parts being cut on a bevel providing a stop limiting said first-named movement of said parts when the latter are in alignment with each other.

15. In a machine of the character described, the combination with the frame and operating mechanism therefor, and the means for controlling said mechanism, of a hand-grip, a pair of rearwardly and upwardly extending rods spaced and connected at their lower ends to said frame for pivotal movement about a common axis, said rods converging upwardly and being connected at their upper ends to said hand-grip, a rearwardly and upwardly extending shaft angularly disposed with respect to said rods and having its lower end journaled in and held against relative axial movement with respect to said frame, the upper end of said shaft being journaled in said hand-grip and fixed against relative axial movement with respect thereto whereby said shaft may be rocked about its longitudinal axis and acts as a tie-rod to hold said rods and the hand-grip connected thereto in a predetermined position with respect to said frame, means connecting said controlling means to said shaft for actuation thereby upon rocking movement thereof, and means for causing said movement of said shaft.

16. In a machine of the character described, the combination with the frame and operating mechanism therefor, and the means for controlling said mechanism, of a rearwardly and upwardly extending shaft having its lower end journaled in said frame for rocking movement about its longitudinal axis, means supporting the upper end of said shaft and holding the latter against movement laterally with respect to said frame while permitting said rocking movement of the same, spring means coacting with said frame and the lower end of said shaft for yieldingly holding the latter against relative axial movement with respect to said frame, means connecting said controlling means to said shaft for actuation thereby upon said rocking movement thereof, and means for causing said rocking movement of said shaft.

17. In a lawn mower, the combination with a frame, a motor supported by said frame, a blade member rotatably mounted in said frame, driving connection between said blade member and said motor for rotating said blade member in a predetermined direction, said blade member having a gear rigid therewith, an axially shiftable gear operatively connected to said motor, means for shifting said axially shiftable gear into and out of mesh with said first mentioned gear for reverse rotation of said blade member, and means for interrupting the said driving connection between said motor and said blade member.

In witness whereof I hereto affix my signature.

ALBERT J. DREMEL.